(No Model.)
W. S. HILL.
CONTROLLING SWITCH FOR ELECTRIC MOTORS.
No. 494,565. Patented Apr. 4, 1893.
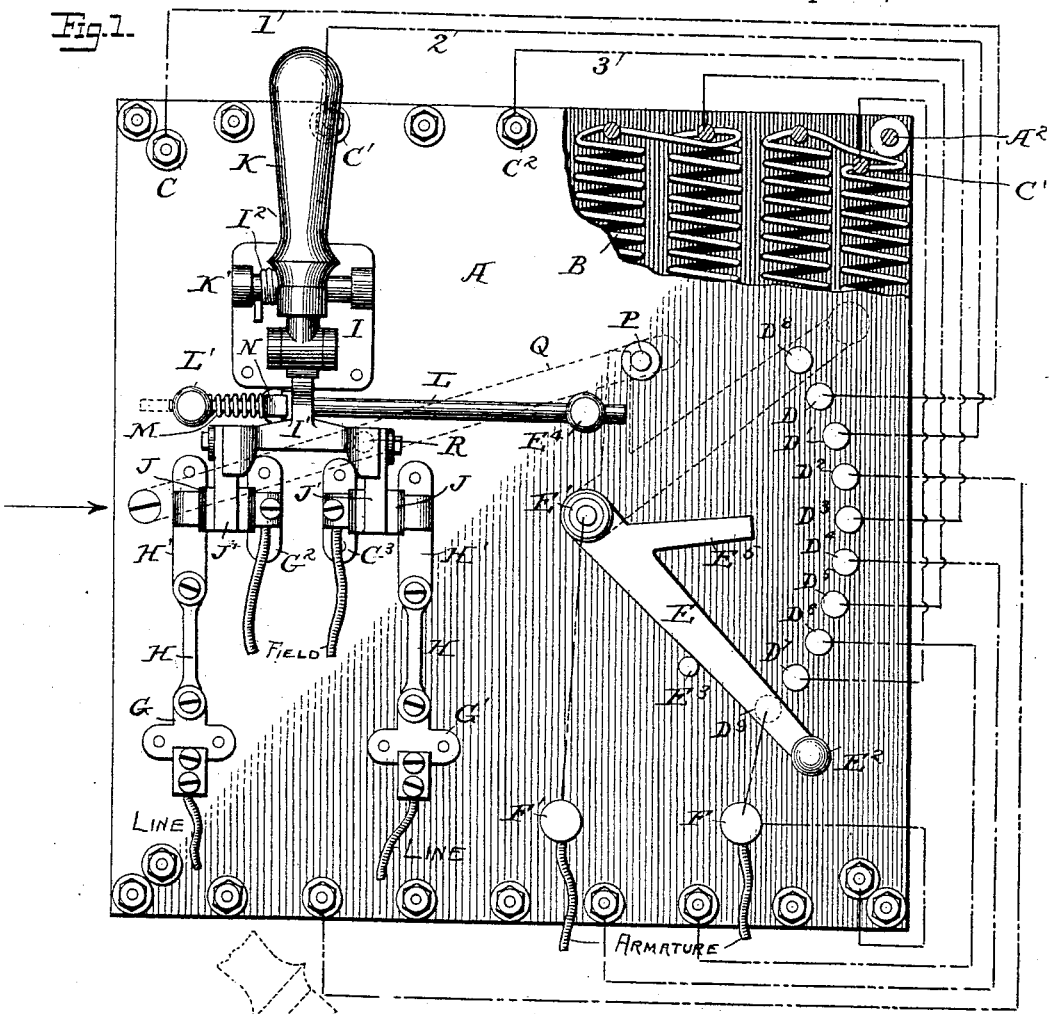
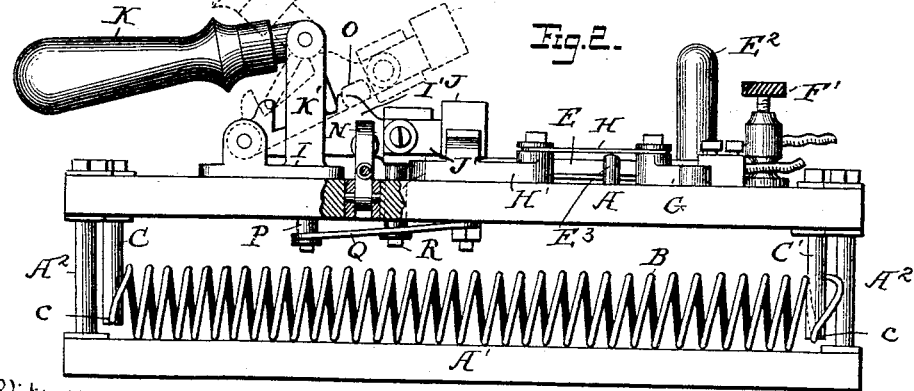
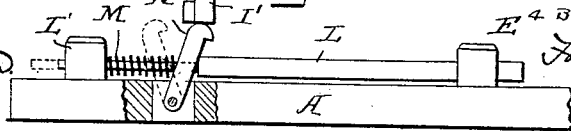
Witnesses
Jno. G. Hinkel
Allen N. Dobson
Inventor
Warren S. Hill
By Foster Freeman
Attorneys
THE NORRIS PETERS CO., PHOTO-LITHO., WASHINGTON, D. C.

UNITED STATES PATENT OFFICE.

WARREN S. HILL, OF BOSTON, MASSACHUSETTS, ASSIGNOR TO THE W. S. HILL ELECTRIC COMPANY, OF MAINE.

CONTROLLING-SWITCH FOR ELECTRIC MOTORS.

SPECIFICATION forming part of Letters Patent No. 494,565, dated April 4, 1893.

Application filed March 31, 1892. Serial No. 427,215. (No model.)

*To all whom it may concern:*

Be it known that I, WARREN S. HILL, a citizen of the United States, residing at Boston, Suffolk county, Massachusetts, have invented certain new and useful Improvements in Electric Switches, of which the following is a specification.

My invention relates to electric switches, and more especially to that class of switches adapted to be used in starting and stopping electric motors, and it consists in the features of construction, arrangement, and mode of operation, substantially such as hereinafter more particularly pointed out.

Referring to the accompanying drawings, Figure 1, is a plan view of the switch embodying my invention. Fig. 2, is a side view of the same in the direction of the arrow Fig. 1; and Fig. 3, is a detail sectional view through the locking bar.

In the operation of electrical devices and especially in the use of electric motors, it is well known that care must be taken in closing the circuit and opening it to prevent accidents to the motor, and it is usual to arrange the switch device so that upon closing the switch, the circuit will first be complete through the field magnet coils, and then through the armature coils, or at least a considerable resistance is at first introduced into the armature circuit to prevent a rush of current through the circuit before the motor has an opportunity to generate sufficient counter electro motive force to prevent damage to the coils of the armature.

Of course by a skilled electrician ordinary switches can be used, but even then for some reason or other, through neglect or accident, it may happen that the switches will not be properly manipulated, and damage may be caused such as the burning out or short circuiting of the armature, and it is the object of my present invention to provide a simple, cheap, and effective switch which shall prevent the possibility of accidents from the causes mentioned, and which is so arranged that the circuits must be opened and closed in the proper manner.

Referring more particularly to the drawings A, A' represent the bases or body of the switch device, which are preferably made of slate or other incombustible material, and these two plates are secured together as by posts $A^2$. Arranged between these plates are the resistance coils B, which in the present instance are shown as consisting of wire, the coils of which extend alternately back and forth between the plates, and projecting from the upper plate at suitable intervals are the posts C, C' $C^2$ &c. which are connected to the various portions of the coils, so that a greater or less quantity of the coils can be included in the circuit in the manner hereinafter described to suit the conveniences or necessities of the case. These posts C have their lower ends notched as at $c$ to receive a portion of one of the coils of the wire forming the resistance, and the wire may be secured in said notch by pressing the parts together, or by soldering or similar means. As the base plates are of non-conducting material, it will be understood that the posts are insulated from each other, as well as various portions of the coils of the resistance. These posts C are connected by suitable conductors 1, 2, 3, &c. (which in the drawings are shown in dotted lines outside of the base plate for convenience, although of course in practice they are arranged within the limits of the plate, preferably being secured to the under side of the plate A) to the contact plates D, D', $D^2$ &c., which are arranged on the upper plate A in a manner to be connected through the medium of the switch arm E, which is shown in the present instance as pivoted at E', and as being provided with a suitable handle $E^2$ of insulating material, by means of which the pivoted switch arm can be moved over the various contacts. The movement of this switch arm is controlled by stop pins $E^3$, $E^4$, and it will be seen that the contact piece $D^8$ is not connected to the circuit, while the contact piece $D^9$ is connected directly to the binding post F, and the pivot pin E' of the switch arm E is also connected directly to the binding post F'. It will thus be seen that when the switch arm E is in the position shown in full lines, Fig. 1, the circuit from the binding post F' leads to the pivot pin E', thence through the switch arm E to the contact piece $D^9$, and directly to the binding post F, there being no material resistance in the circuit, but when the switch arm E is moved in contact with the other contact pieces, more or less of the resistance coils are included in the circuit between the binding posts F' and F. When, however, the switch arm E is in the position shown in dotted lines Fig. 1, the circuit between the binding posts F', F is open. The switch arm E is provided in the present instance with a lateral projection $E^5$, which normally bears against the stop $E^4$ when the switch arm is in the position shown in dotted lines. Also mounted on the base plate are the terminals G, G', $G^2$ $G^3$, and these are connected by the safety fuses H, and the plate H' which in the present instance are shown as forming parts of the double break switch, the other parts or bearing pieces of the switch being connected to the terminals $G^2$, $G^3$. Also mounted on the plate is a support I in which is pivoted the switch arm I' under the stress of a spring $I^2$, which normally tends to hold it in its elevated position shown in dotted lines Fig. 2, and this arm carries in the present instance, the connecting pieces J consisting of leaves of spring metal which are mounted on the insulating material J', which are secured in the branches of the switch arm I'. Also mounted in the support I is a lever K having a bent extension K' which is adapted to bear upon the switch arm I', and forces it downward to close the contacts between the terminals of the switch in a manner well understood, and to hold it in this position. When the handle is turned to the position shown in dotted lines Fig. 2, the spring $I^2$ will raise the switch arm I' to the position shown in dotted lines Fig. 2, making what is known as a double break between the contact pieces of the switch. Using the switch in connection with electric motors, it is usual to connect the coils of the field magnets to the terminals G, G', $G^2$, $G^3$ and to connect the terminals of the armature circuit with the binding posts F', F, and thus the field magnet circuit is controlled by the switch arm I', while the armature circuit is controlled by the pivoted switch arm E.

I have thus specifically described the form of switch shown in the drawings, as that is the preferred arrangement, but of course it will be understood that instead of a double break switch, a single break switch may be used for the field magnet circuit and other equivalent forms of switch may be used for the armature circuit.

As above indicated it is desired to provide means whereby the two switches will have to be operated in proper relations to each other, that is so that the switch I' cannot be closed unless the switch E is in proper condition to prevent injury to the motor and to do this I provide a locking device L, which will prevent the operation of the switch, except under the desired circumstances. This locking device is shown as composed of a rod sliding in bearings L' and $E^4$, the stop $E^4$ being in the present instance provided with an opening for the rod L. This rod is reduced at one end, and provided with a spring M, which normally tends to force it into the position shown in the drawings, and this rod L is also arranged to operate a latch or stop N, which is shown as pivoted in the plate A. In the normal position with the switch I' open, the spring M will force the rod L to the position shown in full lines Figs. 1 and 3, and the latch or stop will be in the position, best shown in Fig. 3, directly under the switch arm I', so that the latter cannot be forced down by the handle K to complete the circuit of the field magnet coils. When, however, the pivoted switch E is moved to the position shown in dotted lines Fig. 1, the arm $E^5$ will force the rod L and the stop N to the position shown in dotted lines Fig. 3, and under these conditions, the switch arm I' can be closed, and it will be observed that this merely closes the circuit through the field magnet coils, the armature circuit being open. When this is done, the switch arm E can be moved over the various contact points D, D,' &c., first closing the armature circuit through all the resistance coils, and gradually cutting out the coils up to the degree required, until it assumes the position shown in full lines, all the resistance will be out of the armature circuit. If, now, the lever K is raised to its elevated position, the spring $I^2$ will release the switch arm I', and break the circuit, and this may be done even when the switch arm E is in the position shown in full lines, without material danger to the motor, but as soon as this switch arm I' rises, the spring M forces the stop N to the position shown in full lines, Fig. 3 and the switch cannot again be closed until the stop is moved out of the way, which requires the pivoted switch arm E to be moved to the position shown in dotted lines Fig. 1.

While I have found a switch as thus constructed to be advantageous and practicable, I provide further means for locking the parts, which requires the movement of the switch arm E, so that the armature circuit shall be cut out gradually through the various resistances before the field magnet circuit can be opened. To do this, I provide the switch arm I' with a projection O adapted to be caught by a latch or stop N when the switch arm is in its closed position, and to be retained until released. I also provide a stop P arranged to prevent the movement of the switch arm E until it is released by the closing of the switch I, and I have shown the stop P as connected to a plate Q mounted on the under side of the plate A, and provided with a pin R extending through the plate, and under the arm I', and arranged so that when the said switch arm I' is depressed the pin R will be depressed, and through the medium of the plate Q will release the locking pin P.

The operation of the switch will be readily understood, it being shown in Fig. 1 with the switch arm I' closed, and the switch arm E completing the armature circuit without including resistance therein, and the switch I' is locked by the stop or catch N engaging the projection O on the arm, and even if the handle K is raised, the spring I² cannot raise the arm to break the circuit. When, however, it is desired to stop the motor, the switch arm E must be moved to the position shown in dotted lines Fig. 1 gradually cutting the resistance into the armature circuit until it is broken when the arm E rises upon the contact D⁸. By this time the lateral projection E⁵ will impinge upon the end of the locking bar L, and force it outward against the spring M to the position shown in dotted lines, and this will release the switch arm I', and allow the spring to break the circuit. At the same time the switch arm I being raised, the spring plate Q will force the stop P upward, so that it will lock the switch arm E against movement until the switch arm I' is again depressed, and through the medium of the projection R forces the locking pin P downward to release the armature switch E. It will thus be seen that the operator cannot through carelessness or otherwise open the field magnet circuit before the armature circuit is broken, and it will further be seen that the armature switch E is locked so that the said circuit cannot be closed until after the field magnet circuit is fully closed, which operation releases the stop P controlling the armature switch.

What I claim is—

1. A switch device comprising the upper and lower plates of insulating material secured together, the resistance coils arranged between the plates, and the posts connected to the upper plate and united to the different sections of the resistance coils, and switch arms also mounted upon the upper insulating plates and connections between the switch arms and posts substantially as described.

2. A switch comprising the upper and lower plates of insulating material connected together, a continuous resistance coil arranged between the plates, posts mounted in the upper plate, and having recesses in their lower ends for receiving portions of the resistance coil, and connections between the posts and the contact plates of the switch, and switch arms mounted on the upper plates and engaging the contact plates, substantially as described.

3. A switch device comprising a break switch connected to the field magnet terminals, and a resistance switch connected to the armature terminals, a locking device for the break switch controlled by the resistance switch, and a locking device for the resistance switch controlled by the break switch substantially as described.

4. In an electric switch the combination of the break switch comprising an arm, and a handle for moving the arm to close the switch, of a stop device in the path of the moving arm, and a resistance switch arranged to control the stop device of the break switch, and a locking device for the resistance switch controlled by the break switch arm substantially as described.

5. In an electric switch the combination with the pivoted break switch arm, of a locking bar for the arm, a stop controlled by the break switch arm and controlling the resistance switch, and a resistance switch controlling the locking bar, substantially as described.

6. In an electric switch the combination with the pivoted break switch arm, a projection on said arm, a spring pressed locking bar, and a stop controlled by the locking bar for engaging the projection on said switch arm, substantially as described.

7. In an electric switch the combination with the pivoted break switch arm, a locking bar, a latch engaging said pivoted break switch arm, and controlled by the locking bar, and a pivoted resistance switch provided with a lateral projection for controlling the locking arm, substantially as described.

8. In an electric switch the combination with the break switch arm, a latch therefor, a locking bar controlling the latch, a pivoted resistance switch arm controlling the bar, and a stop controlling the resistance switch arm and controlled by the pivoted break switch arm, substantially as described.

9. In an electric switch the combination with the pivoted break switch arm, a latch therefor, a locking bar controlling the latch, a resistance switch arm controlling the locking bar, a stop controlling the pivoted switch arm, a spring plate supporting the stop and a projection on the spring plate engaging the pivoted break switch arm, substantially as described.

In testimony whereof I have signed my name to this specification in the presence of two subscribing witnesses.

WARREN S. HILL.

Witnesses:
W. E. STOW,
L. E. HILL.